United States Patent
Hodgson et al.

(10) Patent No.: US 9,771,849 B2
(45) Date of Patent: Sep. 26, 2017

(54) METHOD FOR OPERATING A DELIVERY DEVICE FOR A REDUCING AGENT AND DELIVERY DEVICE FOR A REDUCING AGENT

(75) Inventors: Jan Hodgson, Troisdorf (DE); Peter Bauer, Immenreuth (DE)

(73) Assignee: EMITEC Gesellschaft fuer Emissionstechnologie mbH, Lohmar (DE)

( * ) Notice: Subject to any disclaimer, the term of this patent is extended or adjusted under 35 U.S.C. 154(b) by 86 days.

(21) Appl. No.: 13/544,051

(22) Filed: Jul. 9, 2012

(65) Prior Publication Data

US 2012/0324866 A1 Dec. 27, 2012

Related U.S. Application Data

(63) Continuation of application No. PCT/EP2010/067873, filed on Nov. 22, 2010.

(30) Foreign Application Priority Data

Jan. 8, 2010 (DE) ........................ 10 2010 004 201

(51) Int. Cl.
*F01N 3/00* (2006.01)
*F01N 3/20* (2006.01)

(52) U.S. Cl.
CPC .......... *F01N 3/208* (2013.01); *F01N 2610/02* (2013.01); *F01N 2610/1466* (2013.01);
(Continued)

(58) Field of Classification Search
CPC ................. F01N 3/208; F01N 3/2066; F01N 2610/1466; F01N 2610/1473
(Continued)

(56) References Cited

U.S. PATENT DOCUMENTS 7,017,335 B2 * 3/2006 Huber et al. .................... 60/286
7,594,393 B2 9/2009 Offenhuber et al.
(Continued)

FOREIGN PATENT DOCUMENTS

CN 101084053 A 12/2007
CN 101103184 A 1/2008
(Continued)

OTHER PUBLICATIONS

International Search Report of PCT/EP2010/067873.

*Primary Examiner* — Mark Laurenzi
*Assistant Examiner* — Jason Sheppard
(74) *Attorney, Agent, or Firm* — Laurence A. Greenberg; Werner H. Stemer; Ralph E. Locher

(57) ABSTRACT

A method for operating a delivery device for delivering a reducing agent from a reducing agent tank into an exhaust treatment device of an internal combustion engine of a motor vehicle, includes at least intermittently carrying out a ventilation process of the delivery device during operation of the internal combustion engine. A registration of a ventilation process first occurs. A timing unit having a preset time interval and/or a mass-flow summing unit having a preset total mass flow is then actuated. When the preset time interval and/or the preset total mass flow is reached, the ventilation process is then carried out. In particular, monitoring the delivery device by a pressure sensor can thus be omitted. A delivery device for delivering a reducing agent is also provided.

9 Claims, 2 Drawing Sheets

(52) U.S. Cl.
CPC .. *F01N 2900/0422* (2013.01); *F01N 2900/08* (2013.01); *F01N 2900/12* (2013.01); *F01N 2900/1811* (2013.01); *F01N 2900/1812* (2013.01); *F01N 2900/1814* (2013.01); *Y02T 10/24* (2013.01)

(58) Field of Classification Search
USPC ...................................... 137/563; 220/592.01
See application file for complete search history.

(56) References Cited

U.S. PATENT DOCUMENTS

| | | | |
|---|---|---|---|
| 7,654,080 | B2 | 2/2010 | Ripper et al. |
| 7,818,961 | B2 | 10/2010 | Leonard |
| 8,393,144 | B2* | 3/2013 | Habumuremyi ........ F01N 3/208 60/295 |
| 9,200,557 | B2 | 12/2015 | Eriksson et al. |
| 2007/0068525 | A1* | 3/2007 | Offenhuber et al. .... 128/204.21 |
| 2007/0283685 | A1* | 12/2007 | Ripper .................. B01D 53/90 60/288 |
| 2009/0229674 | A1* | 9/2009 | Revink ......................... 137/197 |
| 2009/0255232 | A1* | 10/2009 | Barcin ............................ 60/274 |
| 2009/0277162 | A1 | 11/2009 | Cominetti et al. |
| 2010/0132335 | A1* | 6/2010 | Theis .............................. 60/286 |
| 2010/0162690 | A1* | 7/2010 | Hosaka et al. .................. 60/295 |
| 2010/0205948 | A1* | 8/2010 | Bauer et al. ..................... 60/303 |
| 2010/0212290 | A1* | 8/2010 | Thiagarajan et al. .......... 60/274 |

FOREIGN PATENT DOCUMENTS

| | | |
|---|---|---|
| CN | 101532415 A | 9/2009 |
| DE | 199 47 197 A1 | 4/2001 |
| DE | 10351458 | 6/2005 |
| DE | 102009009711 A1 | 8/2010 |
| EP | 2116700 A1 | 11/2009 |
| FR | 2858812 A1 | 2/2005 |
| JP | 2006516696 A | 7/2006 |
| JP | 2009002260 A | 1/2009 |
| JP | 2011001895 A | 1/2011 |
| WO | 2005/045209 A1 | 5/2005 |
| WO | 2011162693 A1 | 12/2011 |

* cited by examiner

METHOD FOR OPERATING A DELIVERY DEVICE FOR A REDUCING AGENT AND DELIVERY DEVICE FOR A REDUCING AGENT

CROSS-REFERENCE TO RELATED APPLICATION

This is a continuation, under 35 U.S.C. §120, of copending International Application No. PCT/EP2010/067873, filed Nov. 22, 2010, which designated the United States; this application also claims the priority, under 35 U.S.C. §119, of German Patent Application DE 10 2010 004 201.3, filed Jan. 8, 2010; the prior applications are herewith incorporated by reference in their entirety.

BACKGROUND OF THE INVENTION

Field of the Invention

The invention relates to a method for operating a delivery device for a reducing agent. In particular, the invention relates to a method for operating a delivery device for a liquid reducing agent which can freeze at low ambient temperatures. The invention also relates to a delivery device for a reducing agent.

The exhaust gas of internal combustion engines generally contains substances, the emission of which into the environment is undesirable. For example, in many countries, the exhaust gas of internal combustion engines may only contain nitrogen oxide compounds ($NO_x$) up to a certain limit value. Aside from engine-internal measures through which the emission of nitrogen oxide compounds is reduced through the selection of a suitable operating point of the internal combustion engine, exhaust-gas aftertreatment methods have also become established through which a further reduction in nitrogen oxide emissions is possible.

One option for further reducing nitrogen oxide emissions is so-called selective catalytic reduction (SCR). In that case, a selective reduction of the nitrogen oxides to form molecular nitrogen ($N_2$) takes place by using a reducing agent. One possible reducing agent is ammonia ($NH_3$). In that case, ammonia is often not stored in the form of ammonia, but rather an ammonia precursor is stored which is converted into ammonia as required. That is referred to as a reducing agent precursor. One suitable reducing agent precursor which is used in motor vehicles is urea (($NH_2)_2CO$). Urea is preferably stored in the form of a urea-water solution. Urea and, in particular, urea-water solution is not harmful to health and is easy to distribute, store and dose. A urea-water solution of that type with a urea content of 32.5% is marketed under the trademark AdBlue®.

It is common for a urea-water solution to be carried on-board in a tank system in the motor vehicle and to be dosed in a portioned manner into the exhaust system through the use of an injection system including a pump and an injector.

It is generally necessary for pure reducing agent to be present at the injector for the precisely portioned dosing of reducing agent into the exhaust system. Due to varying operation conditions, it is possible for air bubbles to form in a delivery device for reducing agent. If those air bubbles pass to the injector, they lead to inaccuracy of the dosed reducing agent quantity.

SUMMARY OF THE INVENTION

It is accordingly an object of the invention to provide a method for operating a delivery device for a reducing agent and a particularly advantageous delivery device for a reducing agent, which overcome the hereinafore-mentioned disadvantages or at least alleviate the highlighted technical problems of the heretofore-known methods and devices of this general type. It is sought, in particular, to disclose a method through the use of which a delivery device can be operated in such a way that no air bubbles or only a reduced quantity of air bubbles are present in the delivery device. Furthermore, it should be possible for the method to be carried out in a simple manner without a large amount of technical measurement outlay.

With the foregoing and other objects in view there is provided, in accordance with the invention, a method for operating a delivery device for delivering a reducing agent from a reducing agent tank into an exhaust-gas treatment device of an internal combustion engine of a motor vehicle. The method comprises:

at least intermittently carrying out a ventilation process of the delivery device during operation of the internal combustion engine by:
 a) registering the ventilation process;
 b) activating a timing unit with a preset time interval and/or activating a mass flow summing unit with a preset total mass flow;
 c) waiting for the preset time interval to elapse and/or waiting for the preset total mass flow to be reached; and
 d) carrying out the ventilation process.

In a preferred implementation variant of the method according to the invention, the steps a) to d) according to the invention are carried out in a regularly repeated manner in the form of a loop. In this case, a ventilation process carried out as per step d) is registered in a new step a), and steps a) to d) of the method according to the invention thus begin again.

The expression "reducing agent" used frequently during the course of this description encompasses both a reducing agent and also a reducing agent solution, a reducing agent precursor (in particular urea) or a reducing agent precursor solution (in particular AdBlue®).

The method according to the invention is based on the concept that no explicit determination of whether or not an air bubble is present in a delivery device is carried out. A ventilation procedure is carried out repeatedly, independently of parameters measured in the delivery device and in particular independently of a pressure measurement carried out in the delivery device, in order to prevent relatively large quantities of air bubbles from collecting in the delivery device. It has been found that various methods for determining air bubbles in a delivery device are often prone to errors despite involving a high level of sensor outlay and technical outlay, such that to reliably avoid air bubbles in the delivery device, it is more effective to initiate a ventilation process of the delivery device independently of such data.

With the method according to the invention, it is possible for not only air bubbles but also gas bubbles of other types to be conveyed out of the delivery device. In particular, bubbles of reducing agent which has passed into the gaseous state are conveyed out of the delivery device in an effective manner through the use of the method according to the invention. Gas bubbles of reducing agent may arise, for example, due to high temperatures or due to particularly low pressures in the delivery device. Particularly low pressures may arise, for example, due to the suction action of a pump in the delivery device.

The method according to the invention describes two approaches for specifying the instant for a ventilation process (step d)). In one variant, in step b), a timer with a preset time interval is activated, and step c) resides in waiting until the preset time interval has elapsed. In the implementation of that variant of the method according to the invention, between the ventilation process registered in step a) and the new ventilation process carried out in step d), there can be no time interval which exceeds the preset time interval. The preset time interval is selected so as to reliably prevent a significant quantity of air bubbles from passing into the delivery device and/or forming in the delivery device in that time interval. The time interval is preferably selected in such a way that there is a 90%, in particular 95% and particularly preferably 98% probability of no air bubbles forming in the delivery device within the time interval, or the total volume of air bubbles in the delivery device accounts for less than 10%, in particular less than 5% and particularly preferably less than 2% of the total volume of the delivery device which can normally be filled with reducing agent. In order to attain a probability of 95% or even 98%, it is preferable for the method according to the invention based on the timer or mass flow summing unit to be combined with further measures such as the activation of the ventilation process upon the occurrence of certain events.

Depending on the type of motor vehicle and/or internal combustion engine, the preset time intervals needed to maintain those probabilities may be predefined differently. For example, to attain the specified probabilities, it is necessary to select a significantly shorter time interval for a motor vehicle which is frequently subjected to very vigorous movements (for example a construction vehicle used in off-road situations) than for a motor vehicle which spends most of its time on paved roads.

As another concept for attaining adequate ventilation of a delivery device for a reducing agent, the invention discussed herein proposes, instead of (or in addition to) a timer, the activation of a mass flow summing unit with a preset total mass flow. Step d) then resides in waiting until the preset total mass flow is reached. In this case, the concept is based on the fact that, after the delivery of a certain mass flow by the delivery device, there is a high probability of air bubbles forming in the delivery device. The mass flow delivered by the delivery device is determined, for example, by measurement of the difference between the fill level in step a) and the present fill level in step c), and/or by summation of the reducing agent quantity supplied to the exhaust-gas treatment device. Such monitoring of the reducing agent mass flow is already often carried out to determine the fill level of the reducing agent tank and/or to monitor the reducing agent quantity supplied to the exhaust system. Parallel utilization of that information regarding the mass flow for the determination of suitable instants for the ventilation of the delivery device does not involve great additional outlay in terms of apparatus and/or regulation. A mass flow summing unit can add up the total mass flows delivered by the delivery device. It is thus possible to monitor when the preset total mass flow is reached, in order to subsequently carry out a ventilation process. As is the case with the described timer, the control based on the mass flow also allows the total mass flow to be determined in such a way that there is a defined probability of a certain quantity of air bubbles not arising in a delivery device. The total mass flow should also consequently be selected as a function of the motor vehicle, internal combustion engine and/or field of use of the motor vehicle.

It is particularly advantageous for both the described timing and also the described monitoring through the use of a mass flow summing unit to take place in parallel. In this way, air bubbles in the delivery device can be particularly reliably avoided. Depending on whether the total mass flow or the preset time interval is reached first, the initiation of a ventilation process then takes place in step d).

In accordance with another mode of the method of the invention, at least one additional ventilation process is carried out if at least one of the following events takes place:
  occurrence of a predetermined driving state of the motor vehicle;
  occurrence of a predetermined fill level and/or a predetermined fill level change in the reducing agent tank;
  initial start-up of the delivery device;
  start of operation of the internal combustion engine;
  exchange of a filter or of another component of the delivery device; or
  thawing of frozen reducing agent in the reducing agent tank and/or in the delivery device.

All of these special events which may take place during the operation of a motor vehicle have in common the fact that they are associated with an increased risk of the occurrence of air bubbles or gas bubbles in the delivery device.

A predetermined driving state which is associated with an increased risk of the occurrence of air bubbles in the delivery device is, for example, a defined situation where the motor vehicle is traveling at an oblique angle. Reducing agent is normally extracted from a reducing agent tank through the use of an extraction pipe. When a motor vehicle is traveling at an oblique angle, it may be the case that the fill level of reducing agent in the reducing agent tank runs obliquely, and thus the suction side of the extraction pipe emerges from the reducing agent, and the delivery device sucks in air.

An example of a predetermined fill level at which a ventilation process can be initiated is, in particular, a predefined low fill level in the tank. Specifically then, the suction of air may occur particularly easily because the extraction pipe then possibly emerges from the reducing agent. The combination of predetermined fill levels and particular predetermined driving states is also expedient as a triggering event for ventilation processes. For example, situations in which the vehicle is traveling at an oblique angle (possibly with a reduced angle of inclination) are a problem, in particular, when a fill level is low, because there is a particularly high probability in this case of the extraction pipe emerging from the reducing agent.

Taking predetermined fill level changes into consideration for the initiation of ventilation processes may be expedient, for example, if fill level changes in the reducing agent tank indicate a tank filling process. It is furthermore advantageous to basically initiate a ventilation process after a tank filling process in order to reliably start operation with a completely ventilated delivery device. Fill level changes may also indicate surging movements in the reducing agent tank, in such a way that these can be evaluated as an indirect indication of particular driving states which justify the initiation of a ventilation process.

Upon the initial start-up of the delivery device, it is advantageous for ventilation to be initially carried out in order to directly ensure a reliable provision of reducing agent. Likewise, the execution of a ventilation process upon every start of operation of an internal combustion engine increases the reliability with which the delivery device provides reducing agent. A ventilation process may also be carried out only upon predetermined start-ups of the internal combustion engine. For example, the ventilation process may be carried out only at most upon every fifth, preferably at most upon every fiftieth and particularly preferably at most upon every hundredth start-up. It is also possible for a decision as to whether or not a ventilation process should be carried out to be taken upon the start-up of the internal combustion engine, in which decision it is evaluated how long (what period of time) has elapsed since the internal combustion engine was last operated. For example, it may be checked whether the internal combustion engine was last operated more than one hour, more than one day or even more than 10 days ago, in order to then carry out a ventilation process if appropriate.

It may likewise be expedient to carry out a ventilation process after the exchange of a filter and/or of some other component of the delivery device. During the exchange of the filter and/or of some other component of the delivery device, the delivery device must generally be opened. It is thus particularly easy for air bubbles to pass into the delivery device.

Furthermore, it has been found that air bubbles or gas bubbles can form when frozen reducing agent in the reducing agent tank and/or in the delivery device thaws. It is thus advantageous for ventilation of the delivery device to be carried out after the occurrence of such events.

It is additionally pointed out in this case that the "predetermined" events are generally filed (for example stored), calculated according to present parameters, and/or determined by actions of the operator (for example the driver), in a control unit as limit values, tolerance ranges or the like.

In accordance with a further advantageous mode of the method of the invention, the delivery device has a delivery line, which runs from the reducing agent tank to the exhaust-gas treatment device, and has a return line which branches off from the delivery line and opens into the reducing agent tank, wherein during the ventilation process of the delivery device, reducing agent is circulated through the delivery line and the return line.

Through the use of such circulation, the air bubbles in the delivery device can be conveyed through the return line and back into the reducing agent tank. In the case of such circulation, it is not important how large the quantity of reducing agent actually conveyed in the circuit is, because during the circulation, the reducing agent passes back into the reducing agent tank and is therefore not lost. It is, however, advantageous for the quantity of reducing agent conveyed in the circuit during the circulation during the ventilation process to be set in such a way that the air bubbles in the delivery device can be reliably conveyed back into the reducing agent tank, and at the same time the quantity conveyed in the circuit is small. It is thus possible firstly for the duration of the ventilation process to be kept short, and secondly for the amount of energy required for the circulation to be kept low. For example, the quantity conveyed in the circuit may amount to 2 times, preferably 1.5 times and particularly preferably 1.1 times the total volume, which is normally filled with reducing agent, of the delivery device.

It is particularly preferable for a distinction to be made between a first ventilation process, which is carried out, for example, after an initial filling and/or a filter exchange, and a second ventilation process which is carried out in further predefined situations. During the first ventilation process, the quantity conveyed in the circuit should amount to at least double the volume of the lines and/or of the filter of the delivery device together. During the second ventilation process, the quantity conveyed in the circuit may be lower. For example, the quantity conveyed in the circuit may in this case amount to less than double the volume of the lines and/or the single volume of the filter of the delivery device together. It is preferable if, in the case of the second ventilation volume, the conveyed quantity corresponds to double the volume of the lines and half the volume of the filter. The background for the distinction between the first ventilation process and the second ventilation process is that, during the execution of the first ventilation process, the delivery device is initially filled to a relatively great extent with air, whereas the second ventilation process can proceed from a considerable residual quantity of reducing agent in the delivery device.

It is not important for that quantity which is conveyed in the circuit whether it is composed of air bubbles or of reducing agent. What is important is rather the volume of the quantity conveyed in the circuit.

In accordance with an added mode of the method of the invention, the time interval and/or the overall mass flow is varied as a function of at least one of the following parameters:

fill level in the reducing agent tank;
temperature of the reducing agent;
mass flow of reducing agent supplied to the exhaust-gas treatment device;
speed of the motor vehicle;
rotational speed of the internal combustion engine of the motor vehicle; and
outside temperature.

It is particularly advantageous for the time interval and/or the total mass flow to be defined as a function of the fill level in the reducing agent tank. In the case of high fill levels, the probability of an air bubble passing into the delivery device is low, so that long time intervals and/or high total mass flows can be used. In the case of low fill levels, the probability of an air bubble passing into the delivery device is increased, so that shorter time intervals and/or lower total mass flows are expedient.

It has been found that the probability of the occurrence of air bubbles in the delivery device is particularly high when the reducing agent is at an elevated temperature. For this reason, it may be expedient for the time interval and/or the total mass flow to be set in opposition to the temperature of the reducing agent. At particularly high temperatures, particularly short time intervals and/or particularly low total mass flows are then set. At low temperatures of the reducing agent, long time intervals and/or high total mass flows are set. More complex relationships between the temperature of the reducing agent and the preset time interval or preset total mass flow are also conceivable.

The preset time interval and/or the preset total mass flow may also be set as a function of the mass flow per unit time of reducing agent supplied to the exhaust-gas treatment unit, the speed of the motor vehicle and/or the rotational speed of the internal combustion engine. Those influential variables have in common, for example, the fact that high mass flows per unit time of reducing agent, a high speed of the motor vehicle and high rotational speeds of the internal combustion engine generally allow it to be concluded that the motor vehicle is performing large or intensive movements. For this reason, it may be advantageous for the time intervals and/or the total mass flow to generally likewise be determined inversely proportionally to those parameters.

A different approach must be taken in the case of the outside temperature as parameters. In particular, at low outside temperatures, the probability of freezing of the reducing agent in the reducing agent tank and/or in the delivery device is considerably increased. As already stated, it is very easily possible for air bubbles or gas bubbles to form in the delivery device in particular in the event of thawing of frozen reducing agent. Therefore, the preset time interval and/or the preset total mass flow should, in particular in the region of low outside temperatures, be regulated (proportionally) in the same sense as the outside temperatures, so that at particularly low outside temperatures, particularly short time intervals or particularly low mass flows are also present, whereas at high outside temperatures, longer time intervals and/or higher total mass flows are present. At particularly significantly elevated outside temperatures, there is in turn the risk of evaporation and/or vaporization of reducing agent. It may therefore be expedient to provide shorter time intervals or lower total mass flows.

In accordance with an additional advantageous mode of the method of the invention, only phases of operation of the internal combustion engine are counted towards a time interval. This means that the timing unit which is activated in step b) disregards any time periods in which the motor vehicle is at a standstill. Such control is not necessary if the method according to the invention is carried out through the use of a mass-flow summing unit and a total mass flow, because when the motor vehicle is at a standstill, it is generally the case that no reducing agent is delivered by the delivery device, and therefore intervals in which the internal combustion engine is at a standstill are not counted here in any case.

In accordance with yet another advantageous mode of the method of the invention, a time interval lasts at least 5 minutes and at most 5 hours, preferably at least 10 minutes and at most 2 hours, and particularly preferably at least 10 minutes and at most 1 hour.

In accordance with yet a further advantageous mode of the method of the invention, a total mass flow amounts to at least 100 ml [milliliters] and at most 5 l [liters], preferably at least 200 ml [milliliters] and at most 2 l [liters], and particularly preferably at least 200 ml [milliliters] and at most 1 l [liter].

It has been found that, with such a selection of the preset time intervals and of the preset total mass flows, firstly the frequency of the ventilation processes is still justifiable and, furthermore, it can be ensured with sufficient probability that no air bubbles are present in the delivery device.

In accordance with yet an added advantageous mode of the method of the invention, the exhaust-gas treatment device has a storage capacity for reducing agent and, before the ventilation process, an increased quantity of reducing agent is delivered in order to fill the storage capacity with reducing agent. In exhaust-gas treatment systems which are constructed for selective catalytic reaction, so-called ammonia storage catalytic converters are normally provided. Ammonia can be accumulated in the ammonia storage catalytic converters. The ammonia is available for selective catalytic reduction in an SCR catalytic converter. The ammonia storage catalytic converter and SCR catalytic converter may also be present in the form of a common coating on one carrier structure. The supplied reducing agent or the supplied reducing agent precursor solution must, if appropriate, initially be converted into ammonia for storage. A hydrolysis catalytic converter may be provided for this purpose. In any case, adequate temperatures are required for the hydrolytic and/or thermolytic conversion of the reducing agent precursor solution. The amount of ammonia stored in a storage catalytic converter can, through a targeted supply of reducing agent at adequately high temperatures in the exhaust-gas treatment device, be increased before a ventilation process, in such a way that regular operation of the SCR catalytic converter is possible even during the ventilation of the delivery device.

It is particularly preferable for the temperature in the exhaust-gas treatment device to be monitored for the storage of ammonia in a storage catalytic converter, and for the storage to preferably take place when the temperature is between 150° C. and 650° C. It is thus possible for both deposits of reducing agent residues in the exhaust-gas treatment device and also slippage of ammonia out of the exhaust-gas treatment device into the environment to be prevented in an effective manner.

In accordance with yet an additional advantageous mode of the method of the invention, the delivery of reducing agent is interrupted while a ventilation process of the delivery device is taking place. During the ventilation process, the conditions under which reducing agent is provided at the injector of the delivery device for supply into the exhaust system possibly cannot always be reliably controlled. It is therefore advantageous for the delivery operation of the delivery device to be interrupted during the ventilation processes. This is particularly advantageously possible if the exhaust-gas treatment device to which the delivery device is connected has a storage capacity for reducing agent, in such a way that normal operation of an SCR catalytic converter can be ensured even though the delivery device is not delivering reducing agent.

With the objects of the invention in view, there is concomitantly provided a delivery device for delivering a reducing agent from a reducing agent tank into an exhaust-gas treatment device. The delivery device comprises a delivery line running from the reducing agent tank to the exhaust-gas treatment device, the delivery line having a pump for delivering the reducing agent, and no pressure sensor provided within the delivery device.

The delivery device according to the invention is suitable and/or set up in particular for carrying out the method according to the invention. The advantages and special method features highlighted for the method according to the invention can be applied and transferred to the delivery device according to the invention. The same applies to the device features highlighted with regard to the delivery device according to the invention, which can be applied and transferred to the method according to the invention.

A delivery device of this type has an injector which is opened in a time-controlled and/or mass-controlled manner in order to dose reducing agent to the exhaust-gas treatment device in a portioned manner.

A delivery device of this type is particularly advantageous if it does not have an injector which is (only) self-opening. In particular, a self-opening injector should not be provided if the injector can open up a connection to an exhaust-gas treatment component and/or to a mixing chamber. A mixing chamber may, for example, be a space (if appropriate with mixer fittings) for mixing reducing agent with another substance, for example air. A self-opening injector opens automatically when a certain pressure prevails at the self-opening injector or in a delivery line from a pump to the self-opening injector. A self-opening injector may, for example, have a valve which, above a certain pressure, opens and causes the self-opening injector to open up, in such a way that reducing agent emerges. Since it is the case that, if a self-opening injector is provided, practically only pressures up to the opening pressure can be set and, furthermore, virtually no control can be exerted over the state of the reducing agent, specifically in connection with the method according to the invention, other types of injectors are preferred in this case.

Accordingly, a delivery device is preferable, in particular, if a controllable injector is provided. A controllable injector differs from a self-opening injector in that it has an actuation device. An actuation device may, for example, be distinguished by a signal input to which an external signal line can be connected and/or through which an external signal can pass into or to the injector. An external (electrical) signal of that type causes the actuable injector to open and/or close. A controllable injector of that type preferably does not open and/or close under the action of a prevailing pressure. It is, however, not ruled out that a controllable injector cannot only be actuated on the basis of a signal or by an external signal line but rather also opens under the action of the pressure prevailing in the delivery line, and then behaves in the manner of a self-opening injector. For example, a controllable injector may open when a pressure limit value (which may also be variably adjustable by an adjusting device) which is considerably higher than normal operating pressures of the injector is exceeded, in order to prevent the injector from being destroyed by a further rise in pressure (if appropriate, purely an overload protection facility which is not utilized during normal dosing processes). Such an actuable injector may, for example, have a magnetic valve.

Due to the method according to the invention, a pressure sensor within the delivery device is no longer required. In known delivery devices for reducing agent, the pressure sensor was required for monitoring the actual present states. The method according to the invention makes it possible for reducing agent to be provided at the injector with such precisely defined conditions that the monitoring of the state of the reducing agent through the use of a pressure sensor is no longer necessary. Dispensing with a pressure sensor yields a considerable cost advantage for the delivery device. A pressure sensor furthermore generally contains sensitive movable components for determining the pressure, which components must, with considerable outlay, be constructed so as to be capable of withstanding freezing.

If information regarding the pressure in the SCR dosing system is required, pressure information can be gained through the use of the SCR dosing pump even though the SCR dosing system does not have a pressure sensor. The pressure in the SCR dosing system can be determined approximately on the basis of a current characteristic curve of the pump. A supply voltage is applied to the SCR dosing pump for delivery. As a function of the pressure in the SCR dosing system, for a predefined supply voltage, there is a resulting characteristic current flow. The pressure in the SCR dosing system can be determined or calculated from that current flow. A characteristic curve can thus depict a relationship between current flow and pressure. If the SCR dosing pump operates with different supply voltages, it may be necessary for a flow characteristic map to be provided which depicts the relationship between current flow and pressure for the different supply voltages.

Other features which are considered as characteristic for the invention are set forth in the appended claims, noting that the features specified individually in the claims may be combined with one another in any desired technologically meaningful way and may be supplemented by explanatory facts from the description, with further structural variants of the invention being specified.

Although the invention is illustrated and described herein as embodied in a method for operating a delivery device for a reducing agent and a delivery device for a reducing agent, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
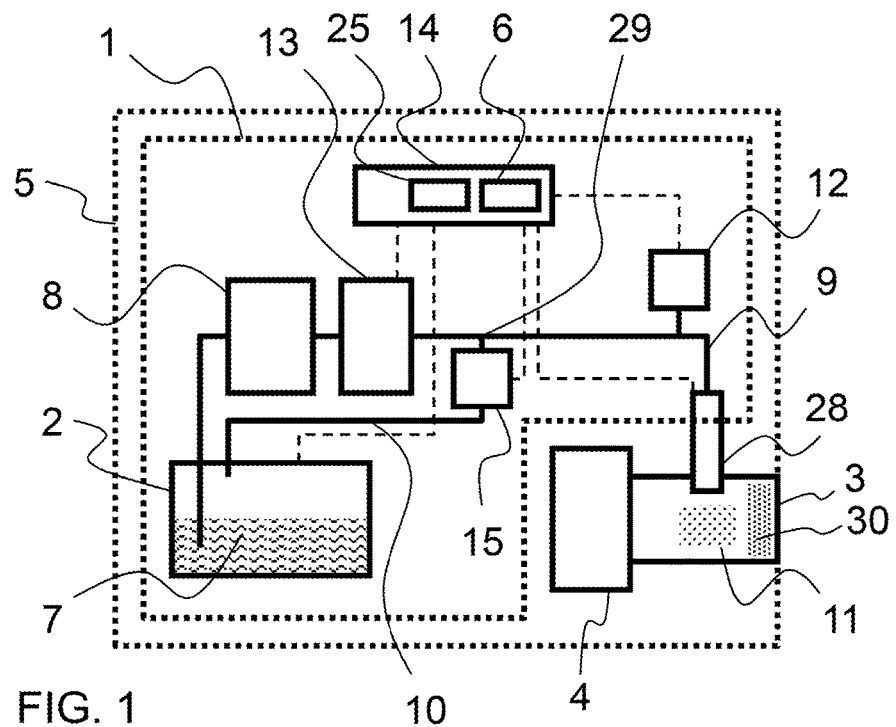
FIG. 1 is a diagrammatic, longitudinal-sectional view of a motor vehicle having a delivery device according to the invention.

Referring now to the figures of the drawings in detail and first, particularly, to FIG. 1 thereof, there is seen a motor vehicle 5 having an internal combustion engine 4 with an exhaust-gas treatment device 3 into which reducing agent can be dosed in a portioned manner by an injector 28 and a delivery device 1. The injector 28 typically has a valve, by which the injector 28 can be opened and closed, and a nozzle. The term 'nozzle' in this case means in particular the form of the region for the exit of reducing agent from the injector 28 into the exhaust-gas treatment device 3. The nozzle makes it possible to ensure that, after exiting the injector 28 into the exhaust-gas treatment device 3, the reducing agent is distributed in a predefined manner, for example with a defined spray pattern. The exhaust-gas treatment device 3 has a storage capacity 11 for ammonia and has an SCR catalytic converter 30. The delivery device 1 delivers reducing agent from a reducing agent tank 2 to the injector 28 through a delivery line 9. Along the delivery line 9 there are provided a filter 8, a pump 13, a branch 29 to a return line 10 and a temperature sensor 12. The return line 10 can be opened and closed through the use of a return valve 15. The injector 28, the pump 13 and the return valve 15 are controlled by a control unit 14. The injector 28 can therefore be controlled or actuated and is not exclusively self-opening. In the control unit 14 there are implemented a timing unit 6 and a mass-flow summing unit 25. As data, the control unit 14 can, if appropriate, process data from the temperature sensor 12 and data regarding a fill level 7 of reducing agent in the reducing agent tank 2. Data from the pump 13, from the return valve 15 and/or from the injector 28 may also be provided. A suitable dosing strategy for dosing reducing agent into the exhaust-gas treatment device 3 can be calculated from that data. Furthermore, the method for ventilation according to the invention can be carried out on the basis of that data.

Figure 2:
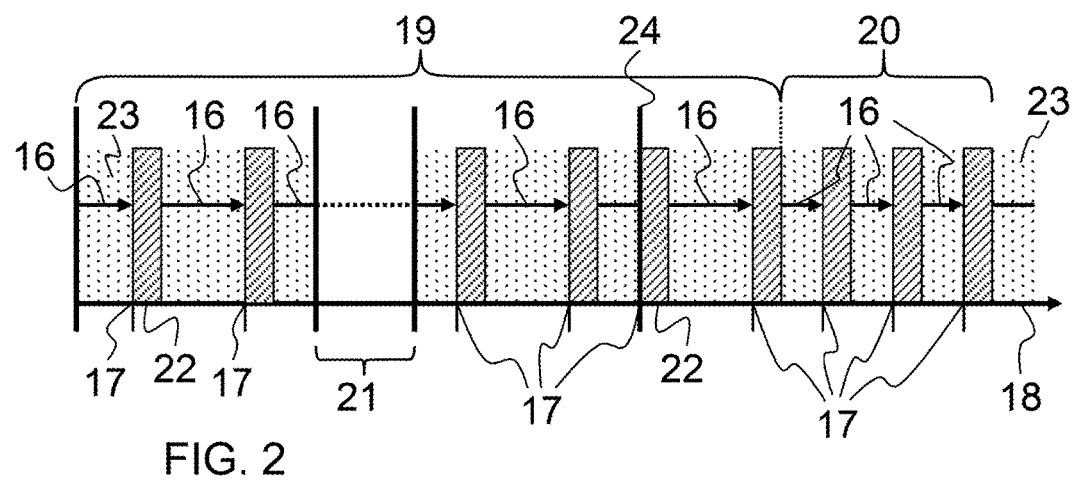
FIG. 2 is a diagram illustrating the operation of the method according to the invention with a timing unit.

FIG. 2 shows a diagram of the operation of the method according to the invention with a timing unit. The diagram shows a time axis 18. In each case one ventilation process 22 takes place at different instants 17 along the time axis 18. A time gap between the individual ventilation processes 22 is predefined by a time interval 16. The time interval 16 is set differently in a first time period 19 than in a second time period 20. In each case only phases of operation 23 of the motor vehicle or of the internal combustion engine are counted towards the time interval 16. FIG. 2 shows, by way of example, a third time period 21 which is not counted towards the time interval 16. This may, for example, be a standstill phase of a motor vehicle. Additionally illustrated in FIG. 2 is a special event 24 at which a ventilation process 22 is initiated regardless of whether or not the time interval 16 has elapsed.

Figure 3:
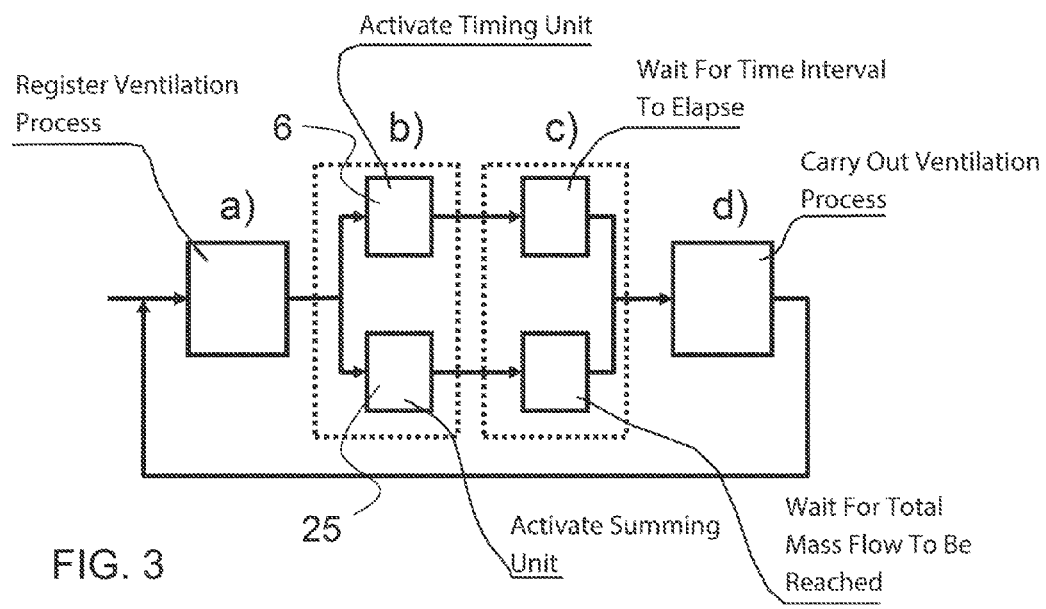
FIG. 3 is a flow diagram of the method according to the invention.

FIG. 3 shows a flow diagram of the method according to the invention. In this case, steps a), b), c) and d) of the method according to the invention are illustrated, with those steps being carried out in a regularly repeated manner in the form of an (iterative) loop during the operation of the internal combustion engine. It can also be seen that steps b) and c) each contain two different embodiments. In the upper embodiment, the timing unit 6 is used, whereas in the lower embodiment, the mass-flow summing unit 25 is used.

Figure 4:
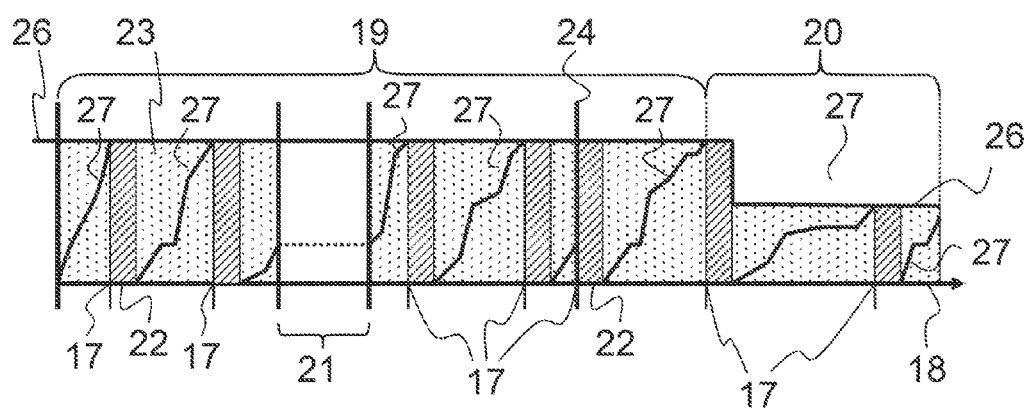
FIG. 4 is a diagram illustrating the operation of the method according to the invention with a mass-flow summing unit.

FIG. 4 shows a further diagram of the operation of the method according to the invention, in which a mass-flow summing unit is used. In this diagram, too, it can be seen that the initiation of a ventilation process 22 takes place at different instants 17 along the time axis 18. In this case, the instants 17 are triggered whenever a mass flow 27 reaches a total mass flow 26. The total mass flow 26 may be defined differently. FIG. 4 shows, by way of example, a first time period 19 and a second time period 20, in which the total mass flow 26 is defined differently in each case. A third time period 21 is also shown in which no operation 23 of a motor vehicle or of an internal combustion engine takes place. In that time period, there is thus also no rise in the mass flow 27, such that when using a mass-flow summing unit, a third time period 21 of this type need not be given any special consideration. FIG. 4 also illustrates an event 24 upon which a ventilation process 22 is triggered even though the total mass flow 26 has not yet been reached.

The method according to the invention permits particularly reliable operation of a delivery device for a reducing agent, in which reducing agent is supplied in the required quantity to an exhaust-gas treatment device in a particularly reliable manner. Through the use of the method according to the invention, it is even possible to dispense with a pressure sensor in a delivery device for reducing agent. This makes it possible to provide a particularly inexpensive and likewise inventive delivery device for reducing agent.

The invention claimed is:

1. A method for delivering a reducing agent from a reducing agent tank into an exhaust-gas treatment device of an internal combustion engine of a motor vehicle, the method comprising the following steps:
at least intermittently ventilating a delivery device during operation of the internal combustion engine to carry air bubbles and gas bubbles out of the delivery device by using a controller to:
a) perform a ventilation of the delivery device at a present point in time by operating a delivery pump to deliver reducing agent to and circulate reducing agent in the delivery device and registering the ventilation;
b) activate a timer for a predefined preset time interval after the present point in time independently of any pressure measurement carried out in the delivery device;
c) determine whether a special event takes place, and prevent an ensuing ventilation of the delivery device until the predefined preset time interval has elapsed or until it is determined that the special event has taken place, said special event comprising one or more of the following:
an occurrence of a predetermined driving state of the motor vehicle;
an occurrence of at least one of a predetermined fill level or a predetermined fill level change in the reducing agent tank;
a start of operation of the internal combustion engine;
an exchange of a filter or of another component of the delivery device; or
a thawing of frozen reducing agent in at least one of the reducing agent tank or the delivery device; and
d) return to step a).

2. The method according to claim 1, which further comprises:
providing the delivery device with a delivery line running from the reducing agent tank to the exhaust-gas treatment device;
providing a return line branching off from the delivery line and opening in the reducing agent tank; and
during the ventilation of the delivery device, further using the controller to operate the delivery pump to circulate reducing agent through the delivery line and the return line.

3. The method according to claim 1, wherein the predefined preset time interval is varied as a function of at least one of the following parameters:
fill level in the reducing agent tank;
temperature of the reducing agent;
mass flow per unit time of reducing agent supplied to the exhaust-gas treatment device;
speed of the motor vehicle;
rotational speed of the internal combustion engine of the motor vehicle; or
outside temperature.

4. The method according to claim 2, which further comprises carrying out step b) by activating the timer with the preset time interval, and only counting phases during the operation of the internal combustion engine towards the time interval.

5. The method according to claim 3, which further comprises carrying out step b) by activating the timer with the preset time interval, and only counting phases during the operation of the internal combustion engine towards the time interval.

6. The method according to claim 2, which further comprises carrying out step b) by activating the timer with the preset time interval, and setting the time interval to last at least 5 min [minutes] and at most 2 hours.

7. The method according to claim 3, which further comprises carrying out step b) by activating the timer with the preset time interval, and setting the time interval to last at least 5 min [minutes] and at most 2 hours.

8. The method according to claim 1, which further comprises:
providing the exhaust-gas treatment device with a storage capacity for reducing agent; and
delivering an increased quantity of reducing agent, before the ventilation, to fill the storage capacity with reducing agent.

9. The method according to claim 1, which further comprises interrupting a delivery of reducing agent while a ventilation process of the delivery device is taking place.

* * * * *